(12) United States Patent
Chen et al.

(10) Patent No.: US 7,143,283 B1
(45) Date of Patent: Nov. 28, 2006

(54) SIMPLIFYING THE SELECTION OF NETWORK PATHS FOR IMPLEMENTING AND MANAGING SECURITY POLICIES ON A NETWORK

(75) Inventors: Shigang Chen, Santa Clara, CA (US); Bo Zou, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 855 days.

(21) Appl. No.: 10/210,538

(22) Filed: Jul. 31, 2002

(51) Int. Cl.
*H04L 9/00* (2006.01)
*H04L 9/32* (2006.01)
*G06F 15/173* (2006.01)
*G06F 17/00* (2006.01)

(52) U.S. Cl. .............. 713/153; 709/223; 709/225; 709/238; 713/162; 713/167; 713/189; 726/1; 726/4; 726/17

(58) Field of Classification Search ............. None
See application file for complete search history.

(56) References Cited

U.S. PATENT DOCUMENTS

| | | | | |
|---|---|---|---|---|
| 5,968,176 A | * | 10/1999 | Nessett et al. ............ | 726/11 |
| 5,987,521 A | * | 11/1999 | Arrowood et al. ......... | 709/239 |
| 6,084,858 A | * | 7/2000 | Matthews et al. ......... | 709/235 |
| 6,185,612 B1 | * | 2/2001 | Jensen et al. .............. | 709/223 |
| 6,678,827 B1 | * | 1/2004 | Rothermel et al. ........ | 726/6 |
| 6,738,908 B1 | * | 5/2004 | Bonn et al. ................ | 726/4 |
| 6,996,716 B1 | | 2/2006 | Hsu | |

* cited by examiner

*Primary Examiner*—Gilberto Barrón, Jr.
*Assistant Examiner*—Laurel Lashley
(74) *Attorney, Agent, or Firm*—Hickman, Palermo, Truong & Becker LLP

(57) ABSTRACT

A plurality of logical nodes are identified from a plurality of elements on a network, where the plurality of elements include security devices. One or more path entries may be determined for at least some of the logical nodes. Each path entry is associated with one of the logical nodes and specifies a set of communication packets, as well as a next node to receive the communication packets from the associated node. The path entries are used to characterize at least a substantial portion of a network path that is to carry communication packets in the set of communication packets.

41 Claims, 5 Drawing Sheets

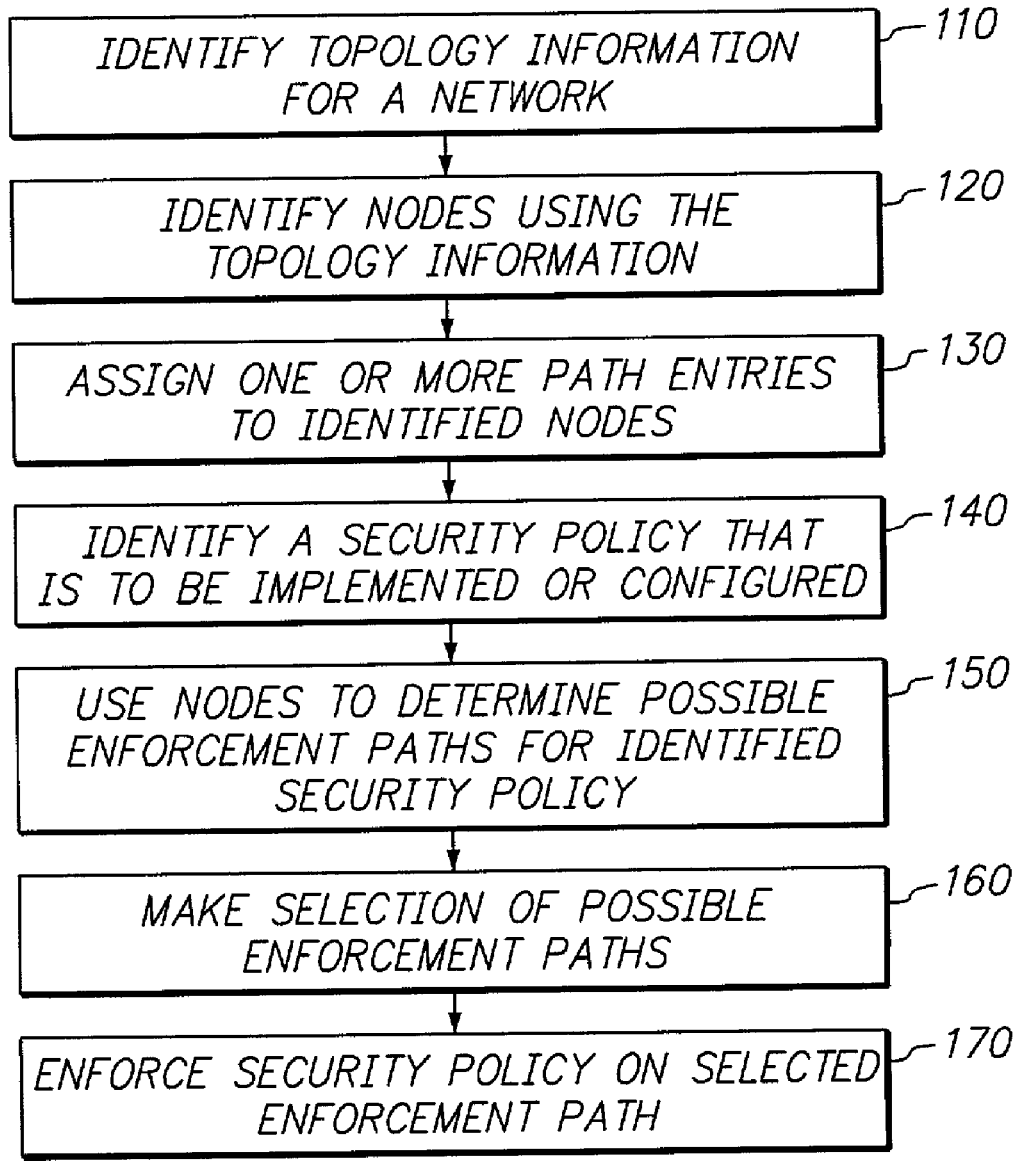

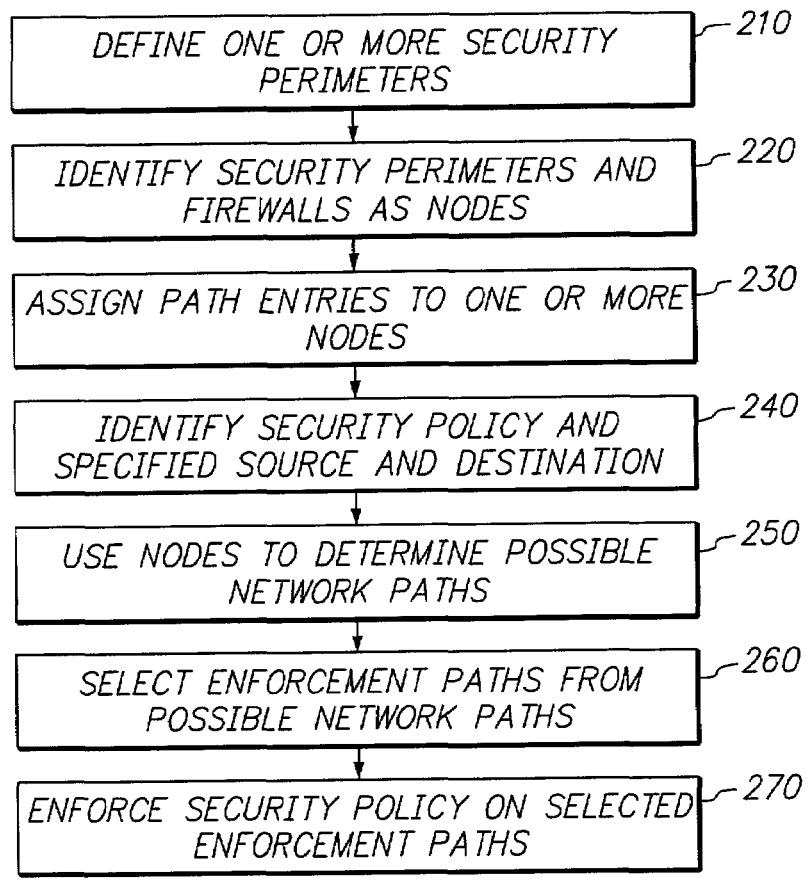
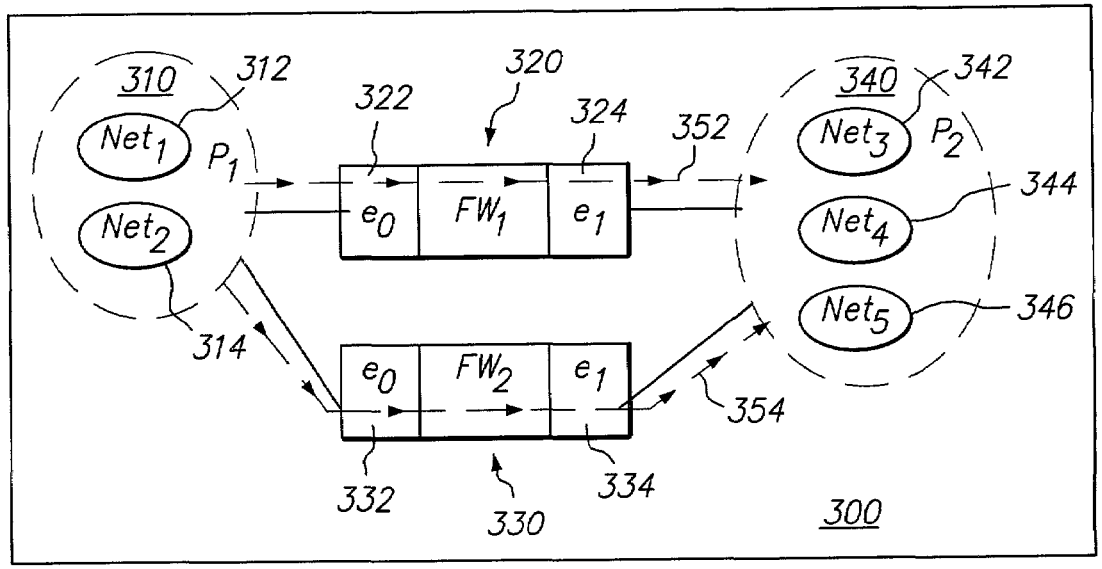

SIMPLIFYING THE SELECTION OF NETWORK PATHS FOR IMPLEMENTING AND MANAGING SECURITY POLICIES ON A NETWORK

FIELD OF THE INVENTION

The present invention generally relates to managing security policies on a network. The invention relates more specifically to simplifying the selection of network paths for implementing and managing security policies on a network.

BACKGROUND OF THE INVENTION

Policy-based network security management is implemented on networks through use of management software, such as CiscoSecure Policy Manager (CSPM) from Cisco Systems Inc. Typically, an administrator enters, into the management software, information that identifies a list of security policies, topology information, and other parameters that may be pertinent for managing security policies. The management software uses the information to determine possible network paths on which security policies are to be implemented. The management software then enforces the security policies on the identified paths.

In some networks, such as interconnected Local Area Networks (LANs), the network paths that are determined by the software management are numerous, often numbering in tens. However, many, if not most of the network paths that are determined by the management software are never actually used because of various network configurations. For example, routing configurations may preclude the use of certain network paths. Due to the complexity of typical networks, the information contained in routing configurations is not always available for use in eliminating unusable network paths from consideration when determining where security policies should be enforced on the network. The result is that the management software implements and manages security policies on network paths that are never actually used.

Previous approaches for eliminating enforcement of security policies on unused network paths have been attempted with varying degrees of success. One approach involves the use of path restriction rules. A path restriction rule usually requires an administrator to identify impermissible combinations of input and output interfaces to firewalls. For example, in a scenario where there is a first firewall having a first interface, and a second firewall having a second interface, an administrator may create a path restriction rule that prohibits any traffic passing into the first firewall through the first interface from passing out of the second firewall through the second interface. As a result, some topological paths are disqualified from becoming paths that can be utilized by the management software.

This approach is problematic because in most cases, many path restrictions are required to make a noticeable difference for managing the security policies. When many path restrictions are used, the net effect of all of the path restrictions is difficult to determine. Moreover, the approach fails to satisfy many scenarios, and the result is that security policies are enforced on many network paths that are never used.

Another typical approach is to calculate all possible paths between a given source node and destination node, and enable the administrator to select paths that will be managed by security policies from all of the possible paths. This approach places a considerable burden on the administrator, because there is often an overwhelming number of possible paths that make path selection by the administrator laborious and time-intensive.

Another approach is to enter routing entries as part of the topology, so as to allow the management software to consider the routing entries in determining all of the possible network paths. This approach requires the user to enter each routing entry. In large networks, the number of routing entries is too large to be efficiently entered and used.

Therefore, there is a need to reduce extraneous network paths when implementing, enforcing and/or managing security policies on a network. There is also a need for reducing the number of routing entries that are to be used for determining which network paths should have security policies enforced upon them.

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 is a description of a basic method for managing security policies by simplifying the selection of enforcement paths on a network;

FIG. 2 is a description of a more detailed method for implementing security policies on a network;

FIG. 3 illustrates one exemplary network for implementing an embodiment of the invention;

DETAILED DESCRIPTION OF THE PREFERRED EMBODIMENT

Figure 4:
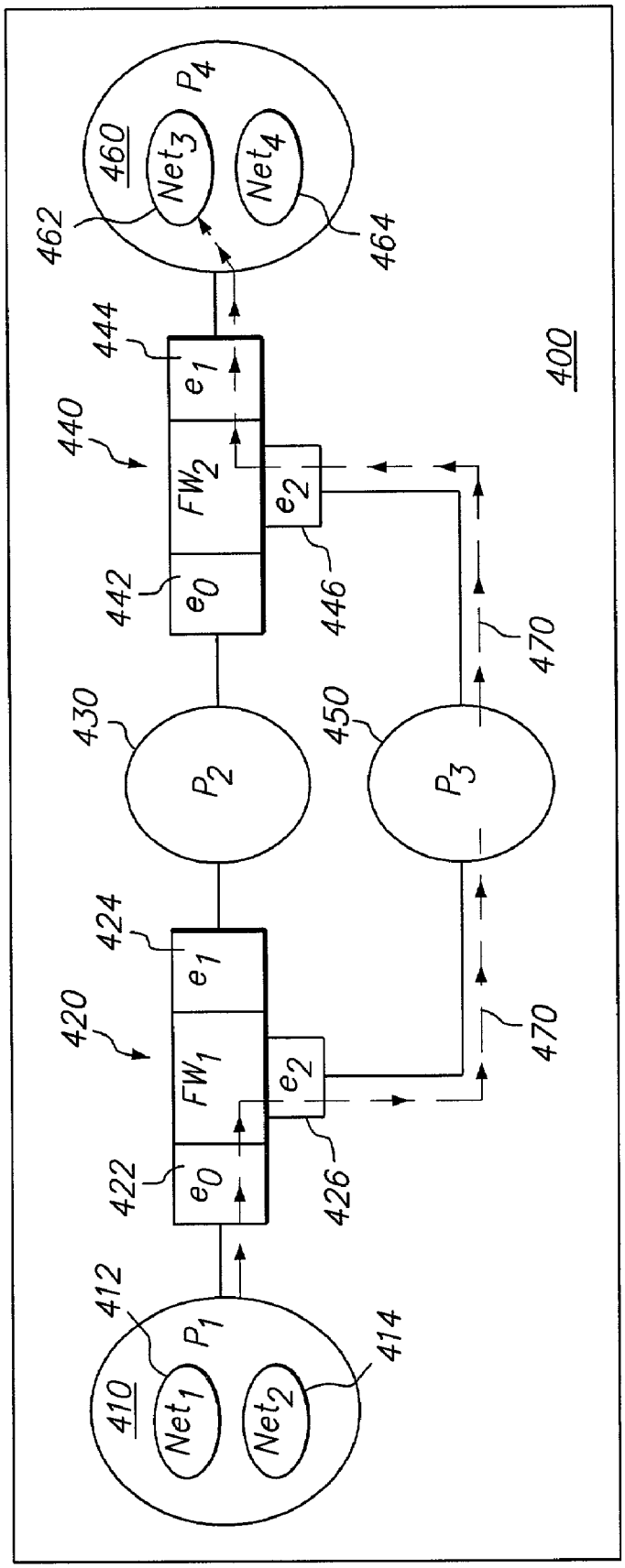
FIG. 4 illustrates another exemplary network for implementing an embodiment of the invention.

A method and apparatus for simplifying the selection of network paths for implementing and managing security policies on a network is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

| | | |
|---|---|---|
| 1.0 | | OVERVIEW |
| | 1.1 | TERMINOLOGY |
| | 1.2 | GENERAL DESCRIPTION |
| 2.0 | | FUNCTIONAL OVERVIEW |
| 3.0 | | TOPOLOGY EXAMPLES |
| 4.0 | | ARCHITECTURE OVERVIEW |

| 5.0 | IMPLEMENTATION MECHANISMS -- HARDWARE OVERVIEW |
| --- | --- |
| 6.0 | EXTENSIONS AND ALTERNATIVES |

1.0 Overview

The needs identified in the foregoing Background, and other needs and objects that will become apparent for the following description, are achieved in the present invention, which comprises, in one aspect, a method for simplifying management of security policies on a network.

1.1 Terminology

An "enforcement path" is a network path that is selected or otherwise used to implement a security policy between a source and a destination.

A "network path" is any sequence of network elements that can be used to carry communication packets between a source and a destination.

A "node" is a logical representation of elements and components of a given network topology. For example, a node represents a collection of elements and components that can be singularized for purpose of determining network connectivity through that collection of elements and components, for communications between a given source and a given destination. In one embodiment, a node is either a security device, such as a firewall, or a collection of elements completely surrounded by security devices. In other embodiments, nodes may represent other portions of the network and/or have different granularities. Examples of network elements, or elements on the network, include firewalls, workstations, sub-networks ("subnets"), switches, gateways, hubs, and routers.

A "path entry" is a data structure that defines a portion of a path between a given source and a given destination. In an embodiment, each path entry is associated with a node, and defines a portion of a network path in terms of nodes. Path entries may specify parameters, which in one embodiment, include a set of communication packets that are subject to the path entry, and a subsequent node or hop for the specified set of communication packets. In one embodiment, the subsequent node or hop is a next node, or a destination element for the set of communication packets.

A "security perimeter" is a set of one or more elements that are completely surrounded by firewalls.

A "subsequent node" to any given node is any node that forms part of a network path between the given node and the destination for a designated set of communication packets. A subsequent node may include a next node, which is the node that is the next hop for a particular communication packet that is received by the given node.

A "substantial portion" means a quantity that is at least 50% of a stated item.

1.2 General Description

Embodiments enable a network topology to be modeled in a manner that simplifies the management of security devices on a network. In doing so, a simplified description of a network is provided that enables management software, and/or a network administrator, to efficiently analyze a network topology and to reduce application of security policies on extraneous network paths that are otherwise never used. In one embodiment, the simplified description of the network can be used to enable the network administrator to enter information that is contained in routing entries or otherwise not available to the management software, for the purpose of significantly reducing enforcement of security policies on unused network paths.

In one embodiment, path entries that represent an aggregation of routing entries are used to define possible network paths between a source and a destination on the network. Each of the path entries may be assigned to a portion of an overall network. A set of possible network paths for implementing a security policy may be defined by a sequence of path entries. The network administrator, or an automatic selection mechanism, may select actual enforcement paths from the set possible network paths. The selection of enforcement paths may be based on information that is not automatically available to the management software, but otherwise known to the administrator. Such information may be provided by actual routing entries which, for example, may select specific directions across firewall interfaces.

In one embodiment, a network may be modeled as a plurality of interconnected logical nodes. Each logical node represents a collection of network elements that may include or be defined by one or more security devices. One or more path entries may be determined for each logical node. Each path entry may specify a set of communication packets and a subsequent logical node that is to receive communication packets in the set of communication packets. The one or more path entries may be used to characterize at least a substantial portion of a network path that is to carry at least some of the communication packets in the set.

A network administrator or other user may specify one or more network paths using the path entries. Alternatively, the network administrator may select actual enforcement paths from among a plurality of possible network paths.

In other aspects, the invention encompasses a computer apparatus, a computer readable medium, and a carrier wave configured to carry out the foregoing steps.

2.0 Functional Overview

FIG. 1 is a basic description of a method for managing security policies by simplifying the selection of enforcement paths on a network.

In step 110, topology information is identified for a network. The topology information may be received from management software and/or information entered by an administrator of a network. The topology information may specify elements on the network, as well as how those elements are interconnected. For example, the topology information may specify firewalls and other elements, the links that interconnect elements, different LANs, the computers that host LANs, and the placement of physical routers between LANs and sub-networks.

In step 120, a plurality of logical nodes are identified based on the topology information. Each node may be viewed as an equivalent representation of a set of components and elements for the purpose of analyzing path information. Components of a node may include, for example, routers, local area networks, and bridges.

In an embodiment, a node coincides with one of either a security perimeter or a firewall. A security perimeter corresponds to a set of elements on the network that is completely surrounded by firewalls. Thus, each logical node corresponds to one or more interconnected elements on a network. A single firewall may correspond to a node because the firewall may need to be configured in order to implement and enforce a particular security policy between two or more nodes.

Step 130 provides that one or more path entries are assigned to one or more of the nodes identified in step 120.

Each path entry is associated with a node. According to one embodiment, each path entry provides routing information for a designated set of communication packets, in that each path entry specifies a portion of a network path for the communication packets that are to pass through the node. The portion of the network path that is specified by the path entry may be defined by one or more parameters. In an embodiment, parameters of a path entry may specify a destination for a designated set of communication packets, and at least one subsequent node between the given node and the destination. The destination may be specified as either a node or an element.

In one embodiment, the subsequent node is a next node. The next node corresponds to a node containing a next component outside of the given node that is to receive a communication packet from the designated set of communication packets. Thus, an embodiment provides that for the designated set of communication packets, a path entry assigned to a particular node specifies a destination node (or element) and a next node to the particular node that is assigned the path entry. In this way, the path entry of a particular node defines a portion of a network path for the designated set of communication packets, in that two sequential nodes are identified for the designated set of communication packets.

In step 140, a security policy that is to be implemented or configured on the network is identified. The security policy may specify or indicate a given source and a given destination, as well as a particular action that is to be performed for communications passing between the source and component. The source or destination may correspond to a range of components or elements, and even nodes, depending on how the security policy is preferably stated.

In step 150, possible enforcement paths between the given source and destination may be determined based on sequences of nodes, as provided by path entries assigned to individual nodes. Since the possible enforcement paths are defined by nodes, the number of possible enforcement paths is much less set than what would otherwise be determined using components or elements that may handle communication packets sent between the source component to the destination component.

Step 160 provides that a selection of enforcement paths are made from the possible enforcement network paths that are determined in step 150. The selection may be made manually by an administrator after all possible enforcement paths for a stated security policy are determined. The selection may also be made programmatically, or through the use of software that may provide additional constraints on which possible enforcement paths can be used. For example, routing configurations may actually preclude components in a first node from accessing components in a second node, even though such precluded paths are identified by combinations of path entries and nodes. The network administrator may use knowledge, or access information not available to the management software, to select enforcement paths from all possible network paths. Since the network topology is modeled as nodes and path entries, the step of selecting enforcement paths can be relatively easy for the network administrator. For instance, the administrator may edit the path entries to make the selection. Similarly, programmatic selection of enforcement paths requires little processing resources, as the number of nodes and path entries is relatively small.

In step 170, the security policy identified in step 140 is enforced on the selected paths between the given source and destination. In order for the security policy to be enforced on the selected paths, firewalls and other security devices that define the nodes forming the selected paths are configured to implement the security policies. For example, one or more firewalls on a selected enforcement path may be configured with access control list entries that combine to enforce the stated security policy.

While embodiments described with FIG. 1 provide for enforcement paths to be selected from all possible paths between a given source and a given destination, other embodiments may provide that path entries are used to identify the enforcement paths directly, with no intermediate step of selecting enforcement paths. For example, when the logical nodes of a network are determined, path entries amongst nodes may be entered and/or configured directly by an administrator in order to specify the enforcement paths for security policies that are to be enforced on the network. The administrator may be able to more readily determine path entries between nodes because the nodes provide a more simplified understanding of the routing information on the network.

FIG. 2 is a more detailed method for implementing security policies on a network. The method of FIG. 2 assumes that topology information for a given network topology is known. Thus, information such as location and number of firewalls, and the interconnectivity of components such as firewalls, hosts, routers, and servers are assumed to be known in an inventory database, network management system or application, directory, server etc.

In step 210, one or more security perimeters are defined on the given topology. As mentioned, each security perimeter corresponds to a set of one or more elements that is completely surrounded by firewalls. Thus, each communication packet that enters the set must be received from a firewall that at least partially surround the set of elements. Likewise, each communication packet that exits the set must also be received by a firewall that partially surrounds the set of elements.

Step 220 provides that the nodes on the given topology are defined by each identified security perimeter and firewall. In one embodiment, each node is either one of a firewall or a security perimeter, other embodiments contemplate assignment of nodes to other groupings and collections of firewalls and components.

In step 230, a path entry is assigned to one or more of the nodes. According to embodiments of the invention, one type of path entry assigned to a particular node is for when the destination of a communication packet is another node. Each of these path entries specify, as parameters, a destination and a next node. Then, when the security policies are enforced, communication packets that are to pass through the particular node are identified by their destinations. For a given destination, a communication packet exiting the particular node is to be passed to the logical node that is designated as the next node for communication packets having that given destination.

While embodiments described herein define each path entry of a given node in terms of its next node, other embodiments may specify other parameters for a communication packet. Such other parameters may include, for example, the destination and a subsequent node, where the subsequent node is any node between the given node and the destination.

In step 240, a security policy specifying a given source and a given destination is identified. The given source and destination may, for example, be specified as elements, components or other nodes. The stated security policy may correspond to some action, such as denying communication packets of a particular dimensional range, that is to be performed by one or more firewalls between the source and the destination.

In step 250, a set of possible network paths between the given source and destination is determined based on a sequence of nodes and the path entries of those nodes. In one embodiment, the network paths identify a source node where the source of the specified security policy is located, one or more intermediate nodes, and a destination node where the destination specified by the security policy is located. The network paths are defined by path entries assigned to the source node, the intermediate nodes, and the destination node. In one embodiment, all possible network paths between a given source and a given destination may be defined using path entries.

Step 260 provides that a selection is made from among the set of possible network paths to identify a smaller set of enforcement paths. For example, as described with FIG. 1, the possible network paths may be presented to a user, who then makes selections of enforcement paths based on the user's knowledge of how a topology is configured. Some network paths may be excluded from enforcing a stated security policy because those network paths would never actually be used to carry communication packets specified by the stated security policy. The user may edit the path entries to make such selection.

In step 270, security policies are enforced on the enforcement paths selected in step 260. This step may involve translating security policies specified by the user into commands, such as access control list entries, which are then used to configure individual firewalls on the selected enforcement paths.

Rather than select enforcement paths from the possible network paths, embodiments of the invention also provide for enforcement paths to be derived from the possible network paths. For example, modifications or minor deletions may be made to path entries that define the possible network paths in order to select the enforcement paths.

3.0 Topology Examples

FIG. 3 and FIG. 4 illustrate example networks for implementing embodiments of the invention. For topologies described by FIG. 3 and FIG. 4, path entries may be developed that enable the selection of enforcement paths for security policies. The path entries represent aggregations of router entries for elements and components that are contained within a defined logical node. Since fewer logical nodes will exist than the components and elements that require router entries, it is possible to model a network into logical nodes so as to determine path entries that describe path information amongst the logical nodes. The path entries are far fewer than the routing entries, but contain the similar information as all of the routing information provided for components and elements of the nodes.

In FIG. 3, a network 300 includes a first network 312, a second network 314, a third network 342, a fourth network 344 and a fifth network 346. Each of the networks include a plurality of components. The networks may correspond to Ethernet LANs or other types of LANs. A first firewall 320 and a second firewall 330 are used to enforce security policies on the network 300.

A first set of network elements consisting of components in the first network 312 and second network 314 are enclosed by the first firewall 320 and the second firewall 330. A second set of elements consisting of components in the third network 342, fourth network 344 and fifth network 346 are also enclosed by the first firewall 320 and second firewall 330. Since any communication into one of the components in the first set must come from one of the first firewall 320 or second firewall 330, the first set of components is labeled as a first security perimeter 310 (labeled as $P_1$). Similarly, the second set of components is labeled as a second security perimeter 340 (labeled as $P_2$).

The first firewall 320 has a first interface 322 (labeled as $e_0$) and a second interface 324 (labeled as $e_1$). The first interface 322 of the first firewall 320 directly connects to first security perimeter 310. The second interface 324 of the first firewall 320 directly connects to second security perimeter 340. The second firewall 330 has a first interface 332 (labeled as $e_0$) that directly connects to first security perimeter 310. The second firewall has a second interface 334 (labeled as $e_1$) that directly connects to second security perimeter 340.

According to an embodiment, network 300 may be modeled as having a first logical node corresponding to first security perimeter 310, a second logical node corresponding to first firewall 320, a third logical node corresponding to third firewall 330, and a fourth logical node corresponding to second security perimeter 340. One or more of the logical nodes may be assigned path entries. Each path entry defines a portion of a possible network path for a designated set of communication packets that may exit the node. Each path entry may have parameters that identify the designated set of communication packets. In one embodiment, a set of communication packets has portions of paths defined by parameters that correspond to destinations of the communication packets, and the next hop for such communication packets.

Path entries may be made applicable to sets of communication packets that are defined by destination address ranges, as such destination addresses are usually part of the header of each communication packet that would enter a node. When a destination of a communication packet is known at a particular node, the next hop for the communication packet to reach its destination may be designated in the path entry so that the path entry defines a partial path for a set of communication packets.

For example, a path entry assigned to first security perimeter 310 may be:

| Destination | Next Hop | |
|---|---|---|
| $P_2$ | FW1.e0 or FW2.e0 | (1) |

This path entry identifies second security perimeter 340 as a destination for communication packets that are going to be subject to the path entry. For all such communication packets, the next hop in terms of logical nodes is either first firewall 320 or second firewall 330. Thus, the path entry provides for two possible network paths between the node corresponding to first security perimeter 310 and the node corresponding to second security perimeter 340. A first possible network path 352 is from first security perimeter 310 through first firewall 320 via its first interface 322 and to the second security perimeter 340. A second possible network path 354 is from first security perimeter 310 through second firewall 330 via its first interface 332 and to the second security perimeter 340.

The path entries simplify the network 300 and facilitate the selection of enforcement paths from a set of possible network paths that are identified through logical nodes. The selection of enforcement paths from the set of possible network paths may be based on information that is external to the software that manages the network 300.

For example, an administrator may know that the second firewall is configured to not receive communications from either first network 312 or second network 314. The simplified network 300 enables the administrator to use the information to reduce the number of network paths that are to be used as enforcement paths. In one embodiment, the administrator is presented one or more path entries that identify multiple possible enforcement paths. Each path entry is sufficiently simple to enable the administrator to select enforcement paths. Upon being presented path entry (1), the administrator may select to not enforce security policies between first security perimeter 310 and second security perimeter 340 on second firewall 330 because that firewall will not receive such communications based on the network configurations. Once the administrator selects the enforcement paths, the path entry (1) is modified as follows:

| Destination | Next Hop | |
|---|---|---|
| $P_2$ | FW1.e0 | (2) |

The path entry (2) is thus modified to reflect that communications from the first logical node cannot pass through the second firewall 330. As such, security policies that regulate communications from components in first security perimeter 310 do not need to be enforced on the second firewall 330.

Once enforcement paths are selected from the set of possible network paths, firewalls that are on the selected enforcement paths may be configured with the desired security policies. In one embodiment, access control list entries are used to configure firewalls that handle communications on the selected enforcement paths. For example, if for a given security policy a component in first network 312 is specified as the source of a communication packet, and a component in fifth network 346 is specified as the destination component, then path entry (2) specifies that only first firewall 320 is to be configured with access control entries that implement the given security policy.

FIG. 4 illustrates a network 400 having a first security perimeter 410 (labeled as $P_1$), a first firewall 420, a second security perimeter 430 (labeled as $P_2$), a second firewall 440, a third security perimeter 450 (labeled as $P_3$), and a fourth security perimeter 460 (labeled as $P_4$). The first security perimeter 410 may correspond to a first network 412 and a second network 414. The fourth security perimeter 460 contains a third network 462 and a fourth network 464.

Communications that exit first security perimeter 410 pass through a first interface 422 ($e_0$) of the first firewall 420. Communications that pass from the first firewall 420 to the second security perimeter 430 exit the second interface 424 ($e_1$) of first firewall 420. Communications that are exchanged between the third security perimeter 450 and first firewall 420 pass through a third interface 426 ($e_2$) of first firewall 420. The second firewall 440 and the second security perimeter 430 exchange communications through a first interface 442 ($e_0$) of the second firewall. The second firewall 440 and the fourth security perimeter 460 exchange communications through a second interface 444 ($e_1$) of the second firewall. Communications that pass between second firewall 440 and the third security perimeter 450 exchange communications through a third interface 446 ($e_2$) of the second firewall.

According to one embodiment, the logical nodes of network 400 include first security perimeter 410, second security perimeter 430, third security perimeter 450, fourth security perimeter 460, first firewall 420 and second firewall 440. Some or all of the nodes may be used to select enforcement paths. It is also possible for some nodes to be combined or ignored when determining enforcement paths.

Given network 400, a path entry may be assigned to one of the firewalls. For example, first firewall 420 may be assigned the following path entry:

| Destination | Next Hop | |
|---|---|---|
| $P_4$ | $P_2$ or $P_3$ | (3) |

Thus, the path entry designates two possible enforcement paths for communication packets passing through first firewall 420 and destined for fourth security perimeter 460. The simplified expression provided by path entry (3) facilitates selection of one enforcement path over another enforcement path. For example, the path entry that may designate the enforcement path of communication packets passing through first firewall 420 and destined for fourth security perimeter 460 may be represented as:

| Destination | Next Hop | |
|---|---|---|
| $P_4$ | $P_3$ | (4) |

According to path entry (4), communication packets passing through first firewall 420 and destined for fourth security perimeter 460 are to pass through third security perimeter 450, but not second security perimeter 430. An enforcement path 470 may be selected for this path entry that fully describes, for purpose of enforcing security policies, communication packets passing from first network 412 to third network 462. The enforcement path 470 includes the first network 412 in the first security perimeter 410, first interface 422 of first firewall 420, first firewall 420, third interface of first firewall 426, third security perimeter 450, third interface 446 of the second firewall, second firewall 440, second interface 444 of the second firewall, and the third network 462 in the fourth security perimeter 460.

Using logical nodes such as security perimeters and firewalls for path entries greatly reduces the actual amount of routing information that needs to be considered when configuring security policies on a network. By defining logical nodes as one of firewalls or security perimeters, assigning path entries to logical nodes, and specifying other logical nodes as destinations in each of the path entries, the models described in the above embodiments are accurate in identifying possible enforcement paths, and in enabling selection of actual enforcement paths from the possible enforcement paths based on external information that would not otherwise be available to the management software.

It is also possible for path entries to define different paths for different destinations within the same logical node. For example, the following path entry may be assigned to first firewall 420:

| Destination | Next Hop | |
|---|---|---|
| Network 4 | $P_2$ | (5) |
| $P_4$ | $P_3$ | |

According to path entry (5), communication packets directed to fourth network 464 of fourth security perimeter 460 will have a different path than communication packets directed to other components or elements of the fourth security perimeter.

The destination may specify a component if that component requires a different path than other elements in the security perimeter.

Not all determined logical nodes of a given network need assigned path entries for embodiments of the invention to be effective. For example, a security perimeter that is connected to only one firewall does not require a path entry assignment, because such a security perimeter has only one possible subsequent hop. In an example provided by FIG. 4, first security perimeter 410 and fourth security perimeter 460 do not require path entries to be assigned to them.

4.0 Architecture Overview

Figure 5:
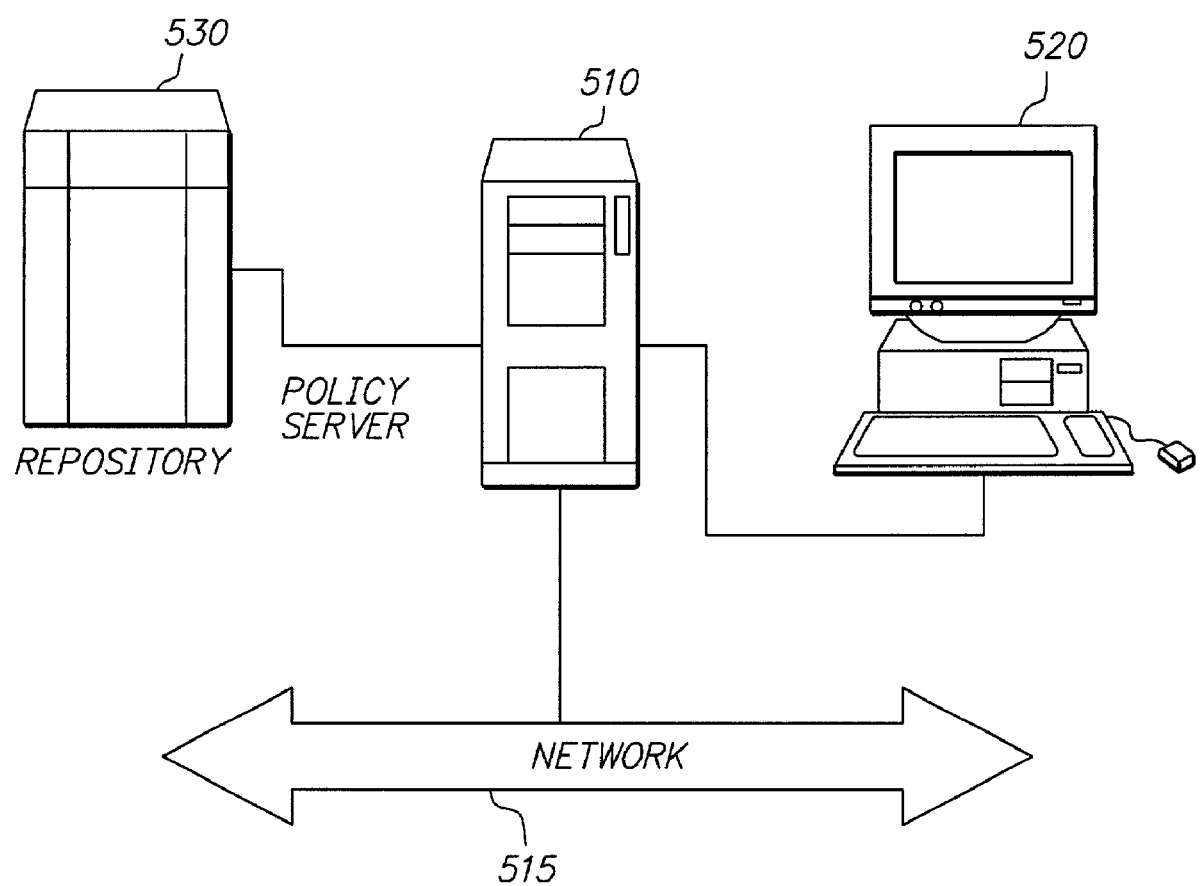
FIG. 5 is a block diagram illustrating a system architecture.

FIG. 5 is a block diagram illustrating a system that can be used to implement embodiments of the invention. The system includes a policy server 510 and a repository 530. The system may also include a terminal 520 to operate the policy server 510. The policy server 510 may access a connected network such as shown by FIG. 3 and FIG. 4 through a network channel 515.

In an embodiment, policy server 510 accesses repository 530 to execute instructions to identify nodes from elements and components on a given network. In addition, policy server 510 may access repository 530 to execute instructions to determine path entries for the identified nodes. The path entries may be used to define network paths between nodes and/or components of the network.

In one embodiment, a characterization of possible network paths for enforcing certain security policies on the network may be presented to the user operating workstation terminal 520. The nodes and path entries may be used to provide the characterization of the network paths. The user may be enabled to select enforcement paths that are estimated to be in use when designated communication packets are transmitted on the network.

For example, the user may specify, through terminal 520, a destination and source component. In response, policy server 510 may present the user with path entries that characterize the network path between the source and destination components in terms of nodes on the network. More than one network path may be shown by the path entries. The user may select from only some of the network paths presented by the path entries. One or more security policies between the specified source and destination components may be specified on the selected network paths. The user may make the selection based on knowledge that one or more of the network paths provided by the path entries are unusable.

As another example, the user may be provided path entries that can be used to characterize network paths using nodes. For given source and destination components, the use may formulate one or more network paths by specifying path entries after viewing the nodes and individual path entries.

In either case, policy server 510 implements security policies on selected network paths based on selections or specifications of path entries made by the user. The implementation of the security policy may involve the policy server 510 using network channel 515 to configure firewalls and other security devices. For example, policy server 510 may configure security devices on selected network paths with access control list entries for purpose of implementing or enforcing a specific security policy between a source and a destination.

Furthermore, the user may access terminal 520 to manage security policies on the network. The security policies may be identified and managed more readily by policy server 510 presenting a topology of the network in terms of path entries and nodes. As a result, management decisions and operations can be more easily viewed and implemented.

5.0 Implementation Mechanisms—Hardware Overview

Figure 6:
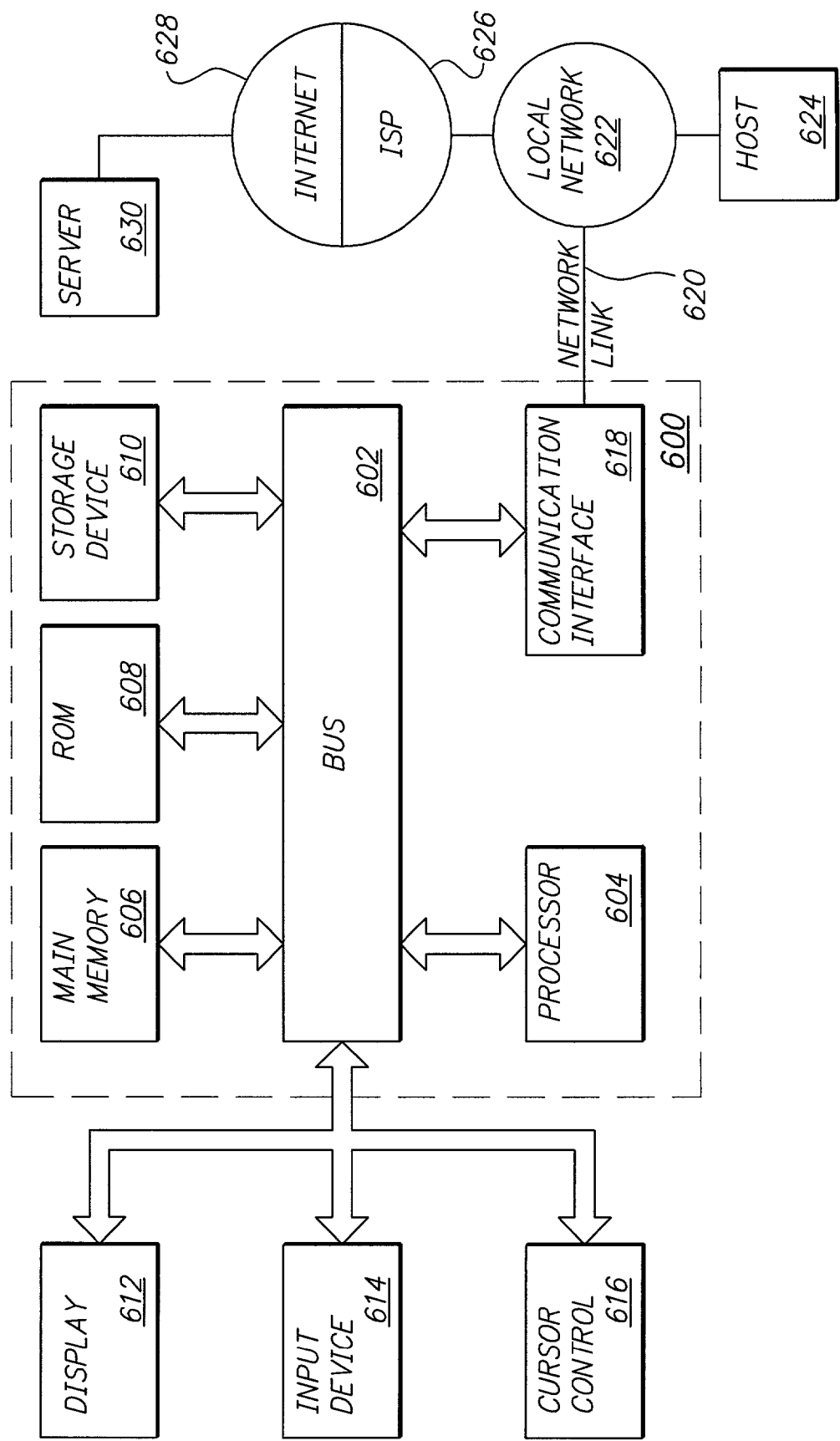
FIG. 6 is a block diagram that illustrates a computer system upon which an embodiment may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory ("RAM") or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory ("ROM") 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube ("CRT"), for displaying information to a computer user. An input device 614, including alphanumeric and other keys, is coupled to bus 602 for communicating information and command selections to processor 604. Another type of user input device is cursor control 616, such as a mouse, trackball, stylus, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for simplifying the selection of network paths for implementing and managing security policies on a network. According to one embodiment of the invention, simplifying the selection of network paths for implementing and managing security policies on a network is provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network ("ISDN") card or a modem to provide a data communication connection to a corresponding type of telephone line. As another example, communication interface 618 may be a local area network ("LAN") card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider ("ISP") 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application provides for simplifying the selection of network paths for implementing and managing security policies on a network as described herein.

The received code may be executed by processor 604 as it is received, and/or stored in storage device 610, or other non-volatile storage for later execution. In this manner, computer system 600 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for simplifying the selection of network paths for implementing and managing security policies on a network, the method comprising the computer-implemented steps of:

identifying a plurality of logical nodes that form a model for a network from a plurality of elements on the network, wherein the plurality of logical nodes is fewer than the plurality of elements and the plurality of elements include one or more security devices that are managed by a set of security policies;

determining one or more path entries for at least some of the plurality of logical nodes, wherein each path entry is associated with a node in the plurality of logical nodes, and wherein each path entry specifies a set of communication packets and a subsequent node in the plurality of logical nodes to receive, from the node associated with that path entry, a communication packet in the set of communication packets; and using the one or more path entries to characterize at least a substantial portion of a network path that is to carry communication packets in the set of communication packets.

2. A method as recited in claim 1, wherein using the one or more path entries to characterize at least a substantial portion of a network path includes using the one or more path entries to characterize at least a substantial portion of all network paths that are to carry communication packets in the set of communication packets.

3. A method as recited in claim 1, wherein:

using the one or more path entries to characterize at least a substantial portion of a network path includes using the one or more path entries to characterize at least the substantial portion of each network path in a plurality of network paths;

and the method further comprises:

enforcing one or more security policies on the plurality of network paths.

4. A method as recited in claim 1, wherein:

using the one or more path entries to characterize at least the substantial portion of a network path includes:

using the one or more path entries to characterize at least a substantial portion of each network path in a plurality of network paths; and
selecting one or more enforcement paths from the plurality of network paths;
and wherein the method further comprises enforcing at least a substantial portion of one or more security policies that are to regulate communication packets in the set of communication packets on the selected enforcement paths.

5. A method as recited in claim 1, wherein using the one or more path entries to characterize at least a substantial portion of a network path includes using the one or more path entries to characterize at least the substantial portion of each network path in a plurality of network paths, and the method further comprises:
enabling a user to select one or more enforcement paths from the plurality network paths; and
enforcing at least a substantial portion of all security policies that are to regulate communication packets in the set of communication packets on the selected enforcement paths.

6. A method as recited in claim 1, wherein determining one or more path entries for at least some of the plurality of logical nodes includes determining one or more path entries that specify a next node as the subsequent node to receive the communication packet from that path entry.

7. A method as recited in claim 1, wherein determining one or more path entries for at least some of the plurality of logical nodes includes determining one or more path entries that specify the set of communication packets based on a common destination for the set of communication packets.

8. A method as recited in claim 1, wherein identifying a plurality of logical nodes from the plurality of elements includes identifying an interface for at least some of the one or more security devices as being part of the node corresponding to that security device.

9. A method as recited in claim 1, further comprising enabling a user to formulate a substantial portion of an enforcement path between a source and a destination based on the plurality of path entries.

10. A method as recited in claim 1, wherein identifying a plurality of logical nodes from a plurality of elements includes identifying as logical nodes, each one of (i) a security device, or (ii) a set of one or more of the network elements that are completely surrounded by security devices, on the network.

11. A method for simplifying the selection of network paths for implementing and managing security policies on a network, the method comprising the computer-implemented steps of:
determining a set of path entries on the network, wherein each path entry is associated with one of (i) one or more security devices, or (ii) a set of elements in a plurality of elements on the network that is completely surrounded by at least one of the one or more security devices, wherein the network comprises at least a set of elements in the plurality of elements that is completely surrounded by at least one of the one or more security devices, wherein each path entry specifies a set of communication packets and indicates information to identify one or more subsequent path entries for a set of network paths that include network paths for carrying the set of communication packets;
using the set of path entries to characterize a substantial portion of at least one network path between a given source element and a given destination element; and enforcing a security policy for regulating communication packets in the set of communication packets on the at least one network path characterized by the path entries.

12. A method as recited in claim 11, wherein using the set of path entries to characterize a substantial portion of at least one network path between a given source element and a given destination element includes:
characterizing a substantial portion of a plurality of network paths for consideration in exchanging communication packets in the set of communication packets; and
selecting one or more network paths from the plurality of network paths for enforcing the security policy.

13. A method as recited in claim 11, wherein using the set of path entries to characterize a substantial portion of at least one network path between a given source element and a given destination element includes displaying a representation of the set of path entries to a user.

14. A method as recited in claim 11, wherein:
using the set of path entries to characterize a substantial portion of at least one network path between a given source element and a given destination element includes displaying to a user a representation of the set of path entries, the set of path entries characterizing a plurality of network paths; and
enabling the user to select one or more network paths from the plurality of network paths for enforcing the security policy.

15. A computer-readable medium carrying one or more sequences of instructions for simplifying the selection of network paths for implementing and managing security policies on a network, which instructions, when executed by one or more processors, cause the one or more processors to carry out the steps of:
identifying a plurality of logical nodes that form a model for a network from a plurality of elements on the network, wherein the plurality of logical nodes is fewer than the plurality of elements and the plurality of elements include one or more security devices that are managed by a set of security policies;
determining one or more path entries for at least some of the plurality of logical nodes, wherein each path entry is associated with a node in the plurality of logical nodes, and wherein each path entry specifies a set of communication packets and a subsequent node in the plurality of logical nodes to receive, from the node associated with that path entry, a communication packet in the set of communication packets; and
using the one or more path entries to characterize at least a substantial portion of a network path that is to carry communication packets in the set of communication packets.

16. A computer-readable medium as recited in claim 15, wherein instructions for using the one or more path entries to characterize at least a substantial portion of a network path include instructions for using the one or more path entries to characterize at least a substantial portion of all network paths that are to carry communication packets in the set of communication packets.

17. A computer-readable medium as recited in claim 15, wherein:
instructions for using the one or more path entries to characterize at least a substantial portion of a network path include instructions for using the one or more path entries to characterize at least the substantial portion of each network path in a plurality of network paths;

and the computer-readable medium carries additional instructions for:
  enforcing one or more security policies on the plurality of network paths.

18. A computer-readable medium as recited in claim 15, wherein:
  instructions for using the one or more path entries to characterize at least the substantial portion of a network path include instructions for performing steps of:
    using the one or more path entries to characterize at least a substantial portion of each network path in a plurality of network paths; and
    selecting one or more enforcement paths from the plurality of network paths;
  and wherein the computer-readable medium carries additional instructions for performing steps of enforcing at least a substantial portion of one or more security policies that are to regulate communication packets in the set of communication packets on the selected enforcement paths.

19. A computer-readable medium as recited in claim 15, wherein instructions for using the one or more path entries to characterize at least a substantial portion of a network path include instructions for using the one or more path entries to characterize at least the substantial portion of each network path in a plurality of network paths, and the computer-readable medium carries additional instructions for performing steps of:
  enabling a user to select one or more enforcement paths from the plurality network paths; and
  enforcing at least a substantial portion of all security policies that are to regulate communication packets in the set of communication packets on the selected enforcement paths.

20. A computer-readable medium as recited in claim 15, wherein instructions for determining one or more path entries for at least some of the plurality of logical nodes include instructions for determining one or more path entries that specify a next node as the subsequent node to receive the communication packet from that path entry.

21. A computer-readable medium as recited in claim 15, wherein instructions for determining one or more path entries for at least some of the plurality of logical nodes include instructions for determining one or more path entries that specify the set of communication packets based on a common destination for the set of communication packets.

22. A computer-readable medium as recited in claim 15, wherein instructions for identifying a plurality of logical nodes from the plurality of elements include instructions for identifying an interface for at least some of the one or more security devices as being part of the node corresponding to that security device.

23. A computer-readable medium as recited in claim 15, further comprising instructions for enabling a user to formulate a substantial portion of an enforcement path between a source and a destination based on the plurality of path entries.

24. A computer-readable medium as recited in claim 15, wherein instructions for identifying a plurality of logical nodes from a plurality of elements include instructions for identifying as logical nodes, each one of (i) a security device, or (ii) a set of one or more of the network elements that are completely surrounded by security devices, on the network.

25. An apparatus for simplifying the selection of network paths for implementing and managing security policies on a network, the apparatus comprising:
  means for determining a set of path entries on the network, wherein each path entry is associated with one of (i) one or more security devices, or (ii) a set of elements in a plurality of elements on the network that is completely surrounded by at least one of the one or more security devices, wherein the network comprises at least a set of elements in the plurality of elements that is completely surrounded by at least one of the one or more security devices, wherein each path entry specifies a set of communication packets and indicates information to identify one or more subsequent path entries for a set of network paths that include network paths for carrying the set of communication packets;
  means for using the set of path entries to characterize a substantial portion of at least one network path between a given source element and a given destination element; and
  means for enforcing a security policy for regulating communication packets in the set of communication packets on the at least one network path characterized by the path entries.

26. An apparatus for simplifying the selection of network paths for implementing and managing security policies on a network, the apparatus comprising:
  a processor; and
  one or more stored sequences of instructions which, when executed by the processor, cause the processor to:
    determine a set of path entries on the network, wherein each path entry is associated with one of (i) one or more security devices, or (ii) a set of elements in a plurality of elements on the network that is completely surrounded by at least one of the one or more security devices, wherein the network comprises at least a set of elements in the plurality of elements that is completely surrounded by at least one of the one or more security devices, wherein each path entry specifies a set of communication packets and indicates information to identify one or more subsequent path entries for a set of network paths that include network paths for carrying the set of communication packets;
    use the set of path entries to characterize a substantial portion of at least one network path between a given source element and a given destination element; and
    enforce a security policy for regulating communication packets in the set of communication packets on the at least one network path characterized by the path entries.

27. An apparatus as recited in claim 25, wherein the means for using the set of path entries to characterize a substantial portion of at least one network path between a given source element and a given destination element includes:
  means for characterizing a substantial portion of a plurality of network paths for consideration in exchanging communication packets in the set of communication packets; and
  means for selecting one or more network paths from the plurality of network paths for enforcing the security policy.

28. An apparatus as recited in claim 25, wherein the means for using the set of path entries to characterize a substantial portion of at least one network path between a given source element and a given destination element includes means for displaying a representation of the set of path entries to a user.

29. An apparatus as recited in claim 25, wherein:
the means for using the set of path entries to characterize a substantial portion of at least one network path between a given source element and a given destination element includes means for displaying to a user a representation of the set of path entries, the set of path entries characterizing a plurality of network paths; and
means for enabling the user to select one or more network paths from the plurality of network paths for enforcing the security policy.

30. An apparatus as recited in claim 26, wherein the processor that is configured to use the set of path entries to characterize a substantial portion of at least one network path between a given source element and a given destination element includes:
the processor that is further configured to characterize a substantial portion of a plurality of network paths for consideration in exchanging communication packets in the set of communication packets; and
the processor that is further configured to select one or more network paths from the plurality of network paths for enforcing the security policy.

31. An apparatus as recited in claim 26, wherein the processor that is configured to use the set of path entries to characterize a substantial portion of at least one network path between a given source element and a given destination element includes the processor that is further configured to display a representation of the set of path entries to a user.

32. An apparatus as recited in claim 26, wherein:
the processor that is configured to use the set of path entries to characterize a substantial portion of at least one network path between a given source element and a given destination element includes the processor that is further configured to display to a user a representation of the set of path entries, the set of path entries characterizing a plurality of network paths; and
enabling the user to select one or more network paths from the plurality of network paths for enforcing the security policy.

33. A method for simplifying the selection of network paths for implementing and managing security policies on a network, the method comprising the computer-implemented steps of:
identifying topology information for a network;
identifying a plurality of logical nodes using the topology information for the network;
assigning one or more path entries to the plurality of logical nodes;
identifying a security policy that is to be implemented or configured for the network;
determining possible enforcement paths for the security policy using the one or more path entries assigned to the plurality of logical nodes;
selecting an enforcement path among the possible enforcement paths; and
enforcing security policy on the enforcement path.

34. A method as recited in claim 33, wherein identifying a plurality of logical nodes using topology information includes identifying as logical nodes, each one of (i) a security device, or (ii) a set of one or more of the network elements that are completely surrounded by security devices, on the network.

35. A method as recited in claim 33, wherein selecting an enforcement path includes enabling a user to select the enforcement path from the possible enforcement paths.

36. An apparatus for simplifying the selection of network paths for implementing and managing security policies on a network, the apparatus comprising:
a processor; and
one or more stored sequences of instructions which, when executed by the processor, cause the processor to carry out the steps of:
identifying topology information for a network;
identifying a plurality of logical nodes using the topology information for the network;
assigning one or more path entries to the plurality of logical nodes;
identifying a security policy that is to be implemented or configured for the network;
determining possible enforcement paths for the security policy using the one or more path entries assigned to the plurality of logical nodes;
selecting an enforcement path among the possible enforcement paths; and
enforcing security policy on the enforcement path.

37. An apparatus as recited in claim 36, wherein said step of identifying a plurality of logical nodes using topology information includes identifying as logical nodes, each one of (i) a security device, or (ii) a set of one or more of the network elements that are completely surrounded by security devices, on the network.

38. An apparatus as recited in claim 36, wherein said step of selecting an enforcement path includes enabling a user to select the enforcement path from the possible enforcement paths.

39. An apparatus for simplifying the selection of network paths for implementing and managing security policies on a network, the apparatus comprising:
means for identifying topology information for a network;
means for identifying a plurality of logical nodes using the topology information for the network;
means for assigning one or more path entries to the plurality of logical nodes;
means for identifying a security policy that is to be implemented or configured for the network;
means for determining possible enforcement paths for the security policy using the one or more path entries assigned to the plurality of logical nodes;
means for selecting an enforcement path among the possible enforcement paths; and
means for enforcing security policy on the enforcement path.

40. An apparatus as recited in claim 39, wherein the means for identifying a plurality of logical nodes using topology information includes means for identifying as logical nodes, each one of (i) a security device, or (ii) a set of one or more of the network elements that are completely surrounded by security devices, on the network.

41. An apparatus as recited in claim 39, wherein the means for selecting an enforcement path includes means for enabling a user to select the enforcement path from the possible enforcement paths.

* * * * *